(12) United States Patent
Kakiuchi

(10) Patent No.: US 7,853,048 B2
(45) Date of Patent: Dec. 14, 2010

(54) PUPIL COLOR CORRECTION DEVICE AND PROGRAM

(75) Inventor: Takashi Kakiuchi, Kusatsu (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 12/375,645

(22) PCT Filed: Mar. 12, 2008

(86) PCT No.: PCT/JP2008/054461

§ 371 (c)(1),
(2), (4) Date: Jan. 29, 2009

(87) PCT Pub. No.: WO2008/126583

PCT Pub. Date: Oct. 23, 2008

(65) Prior Publication Data

US 2010/0008567 A1 Jan. 14, 2010

(30) Foreign Application Priority Data

Mar. 15, 2007 (JP) ............................. 2007-067668

(51) Int. Cl.
*G06K 9/00* (2006.01)

(52) U.S. Cl. ...................... 382/117; 382/167

(58) Field of Classification Search ................. 382/117, 382/275, 167

See application file for complete search history.

(56) References Cited

U.S. PATENT DOCUMENTS 7,116,820 B2 * 10/2006 Luo et al. ................... 382/167

2007/0140556 A1 * 6/2007 Willamowski et al. ...... 382/167

FOREIGN PATENT DOCUMENTS

| JP | 62-192864 | 8/1987 |
|---|---|---|
| JP | 63-129469 | 6/1988 |
| JP | 2-64532 | 3/1990 |
| JP | 2-114253 | 4/1990 |
| JP | 05-019382 | 1/1993 |

(Continued)

OTHER PUBLICATIONS

German Office Action for application No. 11 2008 000 021.2-53, dated Dec. 15, 2009, and English translation thereof, 10 pages.

(Continued)

*Primary Examiner*—Matthew C Bella
*Assistant Examiner*—Dennis Rosario
(74) *Attorney, Agent, or Firm*—Osha Liang LLP

(57) ABSTRACT

An iris color correction apparatus has a skin color identification section which identifies the skin color of a photographed person in an inputted image, a skin correction color calculation section which obtains a skin correction color that is an iris color of said person that should be shown in said image based on the skin color identified by said skin color identification section, a brightness estimation section which estimates a brightness before a color tone abnormality occurs in pixels of an iris portion of said photographed person from a value of said pixels, and a correction section which corrects the iris color of said photographed person based on said estimated brightness and a correction reference color based on said skin correction color.

9 Claims, 3 Drawing Sheets

FOREIGN PATENT DOCUMENTS

| | | |
|---|---|---|
| JP | 2634511 | 4/1997 |
| JP | 9-261580 | 10/1997 |
| JP | 2005-148033 A | 6/2005 |
| JP | 2005-158033 A | 6/2005 |
| JP | 2005-353010 A | 12/2005 |
| JP | 2006-40230 A | 2/2006 |

OTHER PUBLICATIONS

International Search Report w/translation from PCT/JP2008/054461 dated May 13, 2008 (4 pages).
Patent Abstracts of Japan; Publication No. 2005-353010 dated Dec. 22, 2005; Canon Inc. (1 page).
Patent Abstracts of Japan; Publication No. 2006-040230 dated Feb. 9, 2006; Canon Inc. (1 page).
Patent Abstracts of Japan; Publication No. 2005-148033 dated Jun. 9, 2005; Aarutekku KK (1 page).
Patent Abstracts of Japan; Publication No. 05-019382 dated Jan. 29, 1993; Fuji Photo Film Co. Ltd. (1 page).
Patent Abstracts of Japan; Publication No. 09-261580 dated Oct. 3, 1997; Konica Corp. (1 page).
Patent Abstracts of Japan; Publication No. 2005-158033 dated Jun. 16, 2005; Omron Corporation (1 page).
B. Smolka, K. Czubin, J.Y. Hardeberg, K.N. Plataniotis, M. Szczepanski, K. Wojciechowski, "Towards Automatic Redeye Effect Removal", Pattern Recognition Letters 24 (2003), WWW.ComputerScienceWeb.com, pp. 1767-1785, 2002 Elsevier Science B.V.
Mechanical English Translation of Claims for JP2634511, Publication Date: Apr. 25, 1997, 1 page.
English Patent Abstract of Japan, Publication No. 02-114253, Publication Date: Apr. 26, 1990, 1 page.
English Patent Abstracts of Japan, Publication No. 63-129469, Publication Date: Jun. 1, 1988, 1 page.
English Patent Abstract of Japan, Publication No. 02-064532, Publication Date: Mar. 5, 1990, 1 page.
English Patent Abstract of Japan, Publication No. 62-192864, Publication Date: Aug. 24, 1987, 1 page.

* cited by examiner

PUPIL COLOR CORRECTION DEVICE AND PROGRAM

TECHNOLOGICAL FIELD

The present invention is related to an iris color correction apparatus and program, and is related to an image capturing apparatus which captures images (especially images in which a person's face is captured), an information processing apparatus and output apparatus for handling such image, and effective technology which is applied to software and the like.

PRIOR ART TECHNOLOGY

In both digital cameras and silver halide cameras, in the case where an image is captured using a flash, there is the problem of the red-eye phenomenon occurring in which the pupil portion of the iris or the entire iris becomes a red color. There is the similar problem of the gold-eye phenomenon in which the pupil or the entire iris of a person is captured as a gold color. This kind of red-eye/gold-eye phenomenon (hereinbelow, a description is given for the example of the red-eye phenomenon) is a phenomenon resulting from the reflection by the retina of the flash light shining into the inside of the eyeball from the pupil portion of the iris. Recently, because the distance between the optical axis and the flash of cameras has become closer with the advancement in miniaturization of cameras, the incidence of the red-eye phenomenon has gone up, and becomes a problem again.

A red-eye prevention flash has been proposed as technology for preventing or reducing this kind of red-eye phenomenon when photographing. This is technology in which a flash is emitted lightly just before photographing, and then a flash is emitted again. According to this technology, the pupils of the photographed person are constricted by the first emission, whereby the occurrence of the red-eye phenomenon due to the subsequent flash is prevented or reduced.

However, in the case where the red-eye phenomenon occurs, when it is not possible to retake the picture, there is a need to carry out image correction of the red-eye. As for this kind of image correction technology, a method has been proposed (Patent Publication No. 2634511 (Patent Document 1)) in which correction is carried out by identifying the pixels where the red-eye occurs, and changing the color of these pixels.

However, in the image of the iris where the red-eye phenomenon occurs, the original iris color is lost. For this reason, it is difficult to estimate the original iris color from the image of the iris where the red-eye phenomenon occurred. If the original iris color can not be estimated, it is of course difficult to create a natural image even when a correction is carried out using the technology disclosed in Patent Document 1.

Further, in the judgment of red-eye and the setting of the correction color, it is irrational to have only the iris color form the judgment material in view of the peculiarity of the visual sense of a person judging the color level by a color comparison. Namely, in the particular case where the iris color is close to a brown color, even for image data having the same value, there are times when red-eye is visible and times when red-eye is not visible depending on the conditions. In this case, it is possible to consider the two cases where the irises of such person are originally brown, or where they appear brown due to a weak red-eye phenomenon in irises that originally have a darker color tone. These two cases can not be judged from the iris color, and are judged by the skin color or a color comparison from a color tone of the entire photograph such as the background or the like.

Further, in the particular case of a reddish face or under illumination of a red color or the like, there is the case where a redness removal correction is carried out, namely, a case where it looks unnatural. This is because an iris color is formed that can not be obtained under illumination (under pseudo-illumination in the case of a reddish face) where estimation is carried out from the skin color. Accordingly, in such case, the redness removal correction is strictly a mistake, and it is necessary to create an iris color that matches the skin color, and carry out correction based on this.

From these facts, instead of carrying out a correction process simply focused only on the iris, it is understood that it is necessary to carry out the red-eye judgment and the setting of the correction color by considering the surrounding skin color or a color comparison with the background. Accordingly, based on this kind of consideration, the present inventors discovered a correction method (Laid-Open Patent Application No. 2005-148033 (Patent Document 2)) in which the normal color component of the iris is estimated from the skin color of the photographed person by identifying the skin color of the photographed person from the input image and substituting this skin color in an approximation equation based on statistical results already in effect, regardless of whether or not an abnormality such as the red-eye phenomenon or the gold-eye phenomenon or the like occurs.

Patent Document 1: Patent Publication No. 2634511
Patent Document 2: Laid-Open Patent Application No. 2005-148033

SUMMARY OF THE INVENTION

Problems to be Solved by the Invention

In the invention disclosed in Patent Document 2, even though it becomes possible to realize an iris color that is natural and not awkward for the skin color, because the original brightness of the pixels are already lost due to a red-eye phenomenon or the like, when the iris color is corrected while maintaining the brightness of the red-eye pixels, there is the case where the brightness of the iris after correction becomes high and forms something like a white-eye. In this case, even when the iris color is corrected without being awkward, the brightness appears awkward, and as a result, there is the problem that the correction quality becomes poor.

It is an object of the present invention to provide an iris color correction apparatus and program which make it possible to prevent awkwardness from occurring in an image after correction when a correction process is carried out on an iris portion of a captured image of a person.

Means for Solving the Problems

In order to achieve the object stated above, the iris color correction apparatus according to the present invention is equipped with skin color identification means which identify the skin color of a photographed person in an inputted image, skin correction color calculation means which obtain a skin correction color that is an iris color of said person that should be shown in said image based on the skin color identified by said skin color identification means, brightness estimation means which estimate the brightness before a color tone abnormality such as red-eye or the like occurs in pixels of an iris portion of said photographed person from the value of such pixels, and correction means which correct the iris color of said photographed person based on said estimated brightness and the correction reference color based on said skin correction color.

Further, it is equipped with original iris color calculation means which obtain an original iris color that is a representative color of a peripheral region of the iris of said photographed person from the color of pixels included in the peripheral region, and correction reference color setting means which set a correction reference color by either of said obtained skin correction color or original iris color. Further, it may be equipped with judgment means which judge whether or not an abnormality occurs in the iris color of said person in said image by comparing the skin correction color obtained by said skin correction color calculation means and the color identified from the iris region detected by said iris detection means, wherein said correction means carries out a correction process in the case where an abnormality is judged by the judgment means. Further, the judgment means may be equipped with a function that judges whether or not an iris portion of said person in said image forms red-eye by comparing the redness in the iris color estimated by said iris color estimation means and the redness in the color identified from the iris region detected by said iris detection means.

In the present invention, the skin color identification means may be formed so that the skin color is identified manually by the user, or it may be formed so that the color identified by the user based on the input image or the color of the pixels inside an image specified by the user (i.e., the actual measurement value of the spot specified by the user) or the like is identified as the skin color of such person, or as shown in the embodiments, it may be made so that a face region is detected automatically, and the skin color is obtained based on the pixels belonging to such region.

Similarly, the process which obtains an original iris color in the original iris color calculation means may also be made so that the original iris color is obtained based on a manual operation by the user, or as shown in the embodiments, it may be made so that an iris region is detected and a peripheral region is detected automatically, and the original iris color is obtained based on the pixels belonging to such peripheral portion.

An abnormality occurring in the iris portion of an image is a red-eye phenomenon or a gold-eye phenomenon or the like, for example, and is an abnormality occurring in the color of the entire iris portion or a portion thereof.

In the present invention, the skin color of the photographed person is identified from the inputted image, and the iris color of such person is estimated based on this skin color. Therefore, it becomes possible to estimate an iris color that is natural and not awkward by the consideration of a color comparison for the skin color in this image. Accordingly, it becomes possible to estimate the original iris color (the iris color recognized as appearing (outputted) in the case where an abnormality did not occur) from an image where the original iris color was lost due to the occurrence of a red-eye phenomenon or a gold-eye phenomenon or the like.

Further, because brightness estimation means are provided, and a correction process which takes into account the estimated brightness is carried out, the correction of the pupil to white is prevented, and this makes it possible to realize a high-quality correction in which the brightness before an iris color abnormality phenomenon occurs is made to reappear as much as possible.

Further, in the case where the original iris color of a peripheral region of the iris is obtained, and a function is provided to correct the iris color based on such original iris color, which color (skin correction color/original color) the correction should be based on is set by the correction reference color setting means. Accordingly, in the case where the iris color of the photographed person remains in the peripheral region of the iris, because correction of the iris color can be carried out based on the original iris color possessed by such person by carrying out correction based on the original iris color, it becomes possible to reproduce an iris color that is less awkward. Further, even in the case where, for example, the entire iris forms an abnormality such as red-eye or the like and the original iris color does not remain in the peripheral region of the iris, an iris color correction process can be carried out based on the skin color.

Said brightness estimation means may be equipped with a function that calculates a GB brightness which is a brightness set based on the G and B values from the R, G, B that create the color of the pixels. In this case, said correction means can be made to carry out conversion so that said GB brightness value of the correction reference color becomes the same as the GB brightness value of the correction object pixels while maintaining the ratio of the R, G, B values of the correction reference color.

In the case where a red-eye phenomenon occurs, the amount of increase that rises compared to the brightness value of the original iris is believed to be due to mainly red light. Accordingly, by using the G and B values, it is possible to estimate the brightness value before the occurrence of red-eye.

Further, it may be equipped with face detection means which detect a face region that includes the entire face or a portion thereof of the photographed person in the inputted image, and iris detection means which detect an iris region that includes the entire iris or a portion thereof of said person detected by said face detection means, wherein said skin color identification means identify a skin color based on the color of pixels included in the face region detected by said face detection means, and said original iris color calculation means obtain an original iris color based on the color of pixels included in the peripheral region of the iris detected by said iris detection means. The "iris region" is a region that includes the entire iris or a portion thereof of the photographed person.

In this invention, the iris color correction process can be carried out automatically separately from the input by the user (i.e., without the color or the region in the image for specifying the color being specified by the user at the time of the skin color identification process). Accordingly, it becomes possible to save user labor.

Further, in the case where it is equipped with a function that compares the skin correction color obtained by said skin correction color calculation means and the color identified from the iris region detected by said iris detection means, it may be equipped with judgment means which judge whether or not an abnormality occurs in the iris color of said person in said image, wherein said correction means carries out a correction process in the case where an abnormality is judged by the judgment means. Further, as for the judgment process algorithm in the judgment means, various ones can be applied, for example, by comparing the redness in the iris color estimated by said iris color estimation means and the redness in the color identified from the iris region detected by said iris detection means, it is possible to judge whether or not an iris portion of said person in said image forms red-eye.

In this way, because a correction process is carried out in the case where correction is required, the execution of an unnecessary correction process is reduced, and this reduces the burden on the apparatus. Of course, in the present invention, the correction process may be carried out for the entire image without judging whether such correction is required or not. In this way, even in the case where there is an abnormality that can not be detected by the judgment means, the iris color can be corrected accurately.

The program of the present invention is a program which enables a computer to function as skin color identification means which identify the skin color of a photographed person in an inputted image, skin correction color calculation means which obtain a skin correction color that is an iris color of said person that should be shown in said image based on the skin color identified by said skin color identification means, brightness estimation means which estimate the brightness before a color tone abnormality such as red-eye or the like occurs in pixels of an iris portion of said photographed person from the value of such pixels, and correction means which correct the iris color of said photographed person based on said estimated brightness and the correction reference color based on said skin correction color.

Effect of the Invention

In the present invention, it is possible to prevent correction of the pupil to white, and realize a high-quality correction that is not awkward by estimating the brightness before the phenomenon of an iris color abnormality occurs, and correcting the iris color so that such brightness reappears in the correction of the iris color.

DESCRIPTION OF SYMBOLS

Figure 1:
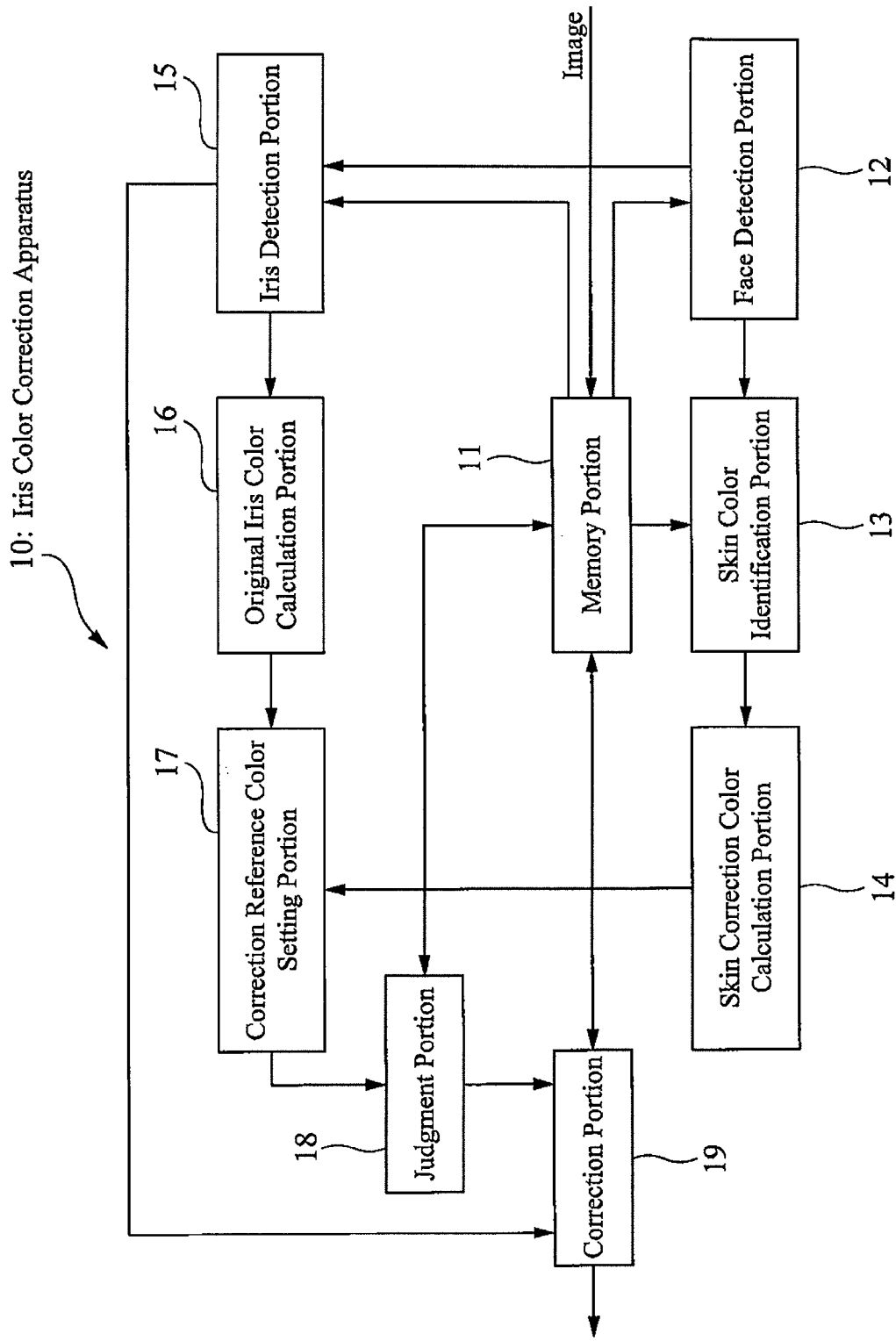
FIG. 1 shows an example of a functional block of a first embodiment of an iris color correction apparatus.

10: iris color correction apparatus
11: memory portion
12: face detection portion
13: skin color identification portion
14: skin correction color calculation portion
15: iris detection portion
16: original iris color calculation portion
17: correction reference color setting portion
18: judgment portion
19: correction portion

PREFERRED EMBODIMENTS OF THE INVENTION

FIG. 1 shows a preferred embodiment of an iris color correction apparatus. An iris color correction apparatus 10, with regard to hardware, is equipped with a CPU (Central Processing Unit) connected via a bus, a main memory (RAM), and an auxiliary memory and the like. The auxiliary memory is constructed using a nonvolatile memory. The nonvolatile memory mentioned here refers to a so-called ROM (including EPROM, EEPROM, mask ROM and the like), a FRAM, a hard disk and the like. This iris color correction apparatus 10 may be formed by installing a prescribed application program in a personal computer, or it may be formed by a dedicated device.

As shown in FIG. 1, because the various programs (OS, applications and the like) stored in the auxiliary memory are loaded in the main memory and executed by the CPU, the iris color correction apparatus 10 of the present embodiment functions as an apparatus that includes a memory portion 11, a face detection portion 12, a skin color identification portion 13, a skin correction color calculation portion 14, an iris detection portion 15, an original iris color detection portion 16, a correction reference color setting portion 17, a judgment portion 18 and a correction portion 19 and the like.

The face detection portion 12, the skin color identification portion 13, the skin correction color calculation portion 14, the iris detection portion 15, the original iris color detection portion 16, the judgment portion 18 and the correction portion 19 are realized by the execution of the application software programs by the CPU. Further, each processing portion may be formed as a dedicated chip. Further, in accordance with the process content carried out by each processing portion, there is suitability or unsuitability with the hardware and software. For this reason, these may be packaged as a hybrid of hardware and software. Hereinbelow, a description is given for each functional portion provided in the iris color correction apparatus 10.

The memory portion 11 stores images inputted in the iris color correction apparatus 10. The memory portion 11 may be formed using a so-called RAM, or may be formed using a so-called ROM. The inputted image data is captured image data and the like that is stored in an internal memory of a digital camera, an external memory, various recording mediums or the like. The transfer of image data from the internal memory of a digital camera is carried out using a communication cable or infrared communication or the like. An external memory or various recording mediums themselves can form the memory portion 11. Further, the image data stored in the memory portion 11 also includes the case of images transmitted from an information processor via an interface.

Figure 2:
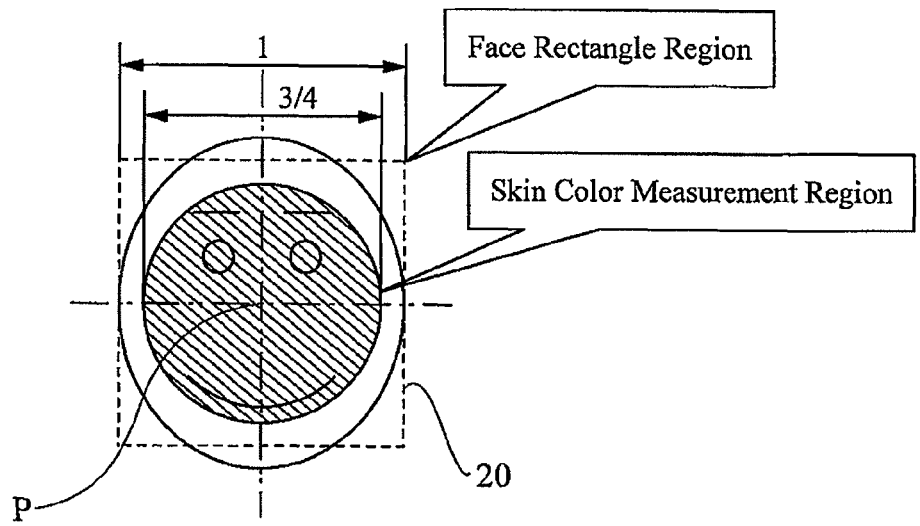
FIG. 2 is a drawing which shows an example of a region identified at the time a face rectangle and a representative value of the skin color are acquired.

The face detection portion 12 carries out a face detection process on an image which forms the processing object of the iris color correction apparatus 10 from the images stored in the memory portion 11. In the face detection process, the face detection portion 12 reads out the image forming the processing object from the memory portion 11, and detect a face rectangle 20 from the read out image. FIG. 2 is a drawing which shows an example of a face rectangle (the face rectangle 20). The face rectangle 20 is a rectangle that includes the face portion of a photographed person.

When the face rectangle 20 is detected, the face detection portion 12 outputs face rectangle information. The face rectangle information is information that shows the size and position of the face rectangle 20. For example, the face rectangle information shows the width and the coordinates of the upper left corner of the face rectangle 20. In accordance with this face rectangle information, the other processing portions identify the position of the face of the photographed person in the processing object image. In the present embodiment, because the aspect ratio of the face rectangle 20 forms a preset fixed value, the region partitioned by the face rectangle 20 can be identified by the face rectangle information formed from the width and the coordinates of the upper left corner of the face rectangle 20.

The face detection process carried out by the face detection portion 12 may be formed so that a face is detected by template matching using a reference template corresponding to the outline of the entire face, for example. Further, the face detection process may be formed so that a face is detected by template matching based on structural elements (eyes, nose, ears, etc.) of the face. Further, the face detection process may be formed so that the apex of the head hair is detected by a Chromakey process, and the face is detected based on this apex. Further, the face detection portion 12 may be formed so that a region near the skin color is detected, and such region is detected as a face. Further, the face detection portion 12 may be formed so that learning is carried out by a teacher signal using a neural network, and a face-like region is detected as a face. The face detection process carried out by the face detection portion 12 is not limited to the examples mentioned above, and may be realized by any other existing method.

The skin color identification portion 13 acquires a representative value of the skin color of the photographed person from the region of the face rectangle 20 detected by the face detection portion 12. Hereafter, this process is called a skin color identification process. The skin color identification portion 13, in the skin color identification process, acquires as a representative value, for example, a statistical value of the color value of the pixels contained the face rectangle 20. As a more preferred embodiment, the skin color identification portion 13 is formed so as to acquire a statistical value of the color value of prescribed pixels from the pixels contained in the face rectangle 20.

"Prescribed pixels" are pixels contained in a region identified from the face rectangle information of the face rectangle 20, for example. As a more concrete example, they may be pixels inside a region identified geometrically from the face rectangle information of the face rectangle 20, for example. In FIG. 2, a region inside a circle having a diameter of ¾ of the width of the face rectangle 20 and centered at the center ("p" in FIG. 2) of the face rectangle 20 is identified as an example of this kind of region.

Further, the "prescribed pixels" may be the pixels that remain after eliminating the pixels forming the noise factor of the skin color measurement from the pixels contained in the face rectangle 20, for example. Examples of pixels forming this kind of noise factor are pixels of face elements (e.g.: eyebrows, eye balls, lips, nostrils) and the shiny portion of the skin and the like. Further, the "prescribed pixels" may be pixels contained inside the face outline identified by an edge extraction process or the like from the pixels contained in the face rectangle 20, for example. Further, the methods of identifying the "prescribed pixels" mentioned above may be combined as the need arises.

The skin color identification portion 13 carries out a statistical process based on the "prescribed pixels," and acquires a representative value of the skin color of the photographed person. The statistical process may be a simple process of an intermediate value, an average value, a mode or the like. Further, in the statistical process, a process that eliminates the noise factor by delimiting a range by, for example, a 3σ method or the like from a histogram may also be carried out.

The skin color identification portion 13 may be formed so as to acquire a representative value of the skin color of the photographed person by a method different from that described above when the skin color statistical process is carried out. To give an example, the skin color identification portion 13 may be formed so as to acquire a color value of identified pixels inside the face rectangle 20 as a representative value.

Based on the representative value of the skin color acquired by the skin color identification portion 13, the skin correction color calculation portion 14 calculates the iris color estimated based on the skin of the photographed person. Hereafter, the iris color estimated by the skin correction color calculation portion 14 is called the "skin correction color." The skin correction color calculation portion 14 acquires a skin correction color based on a conversion function (approximation equation) of each of the colors RGB. This approximation equation shows a correlation between the skin color in an image of the photographed person and the iris color in an image where it is recognized that there is no occurrence of an abnormality such as red-eye or the like. This approximation equation is an equation that is acquired in advance as an advance process. This approximation equation can be obtained in accordance with the process below.

First, a large number of images where it is recognized that there is no occurrence of an abnormality with regard to a red-eye or gold-eye or the like iris image (in other words, "an image that is not awkward", "an image where it is recognized that the iris of the photographed person is captured normal") is collected as sample images. By carrying out a statistical process on these sample images, a correlation is obtained between the skin color in an image of the photographed person and the iris color in an image where it is recognized that there is no occurrence of an abnormality. Namely, first, the skin correction color calculation portion obtains representative values Sn (Srn, Sgn, Sbn) of the skin color of the photographed person in each sample image, and representative values En (Ern, Egn, Ebn) of the normal iris color of such person. These representative values can be acquired by, for example, the same method as that of the statistical process carried out by the skin color identification portion 13. Of course, these representative values may be obtained by any other method.

Next, it is assumed that the conversion function of each color can be approximated by a linear equation, for example. Namely, it is assumed that the conversion function of each color is represented by Equation (1) below.

$$Ec = Ac \cdot Sc + Bc \quad (1)$$

Here, "c" represents any one of the rgb. Further, "A", "B" represent coefficients. In the advance process, the values of the coefficients "A" and "B" are determined by the method of least squares based on the representative values Sn of the skin color and the representative values En of the normal iris color in each sample image. In this way, in the advance process, approximation equations for each RGB color, namely, three approximation equations for estimating the normal iris color from the skin color are obtained.

The skin correction color calculation portion 14 holds such three approximation equations. Accordingly, the skin correction color calculation portion 14 substitutes the representative values of the skin color obtained by the skin color identification portion 13 into the approximation equations obtained in advance, and calculates the normal color (i.e., skin correction color) of the iris of such photographed body estimated based on the skin.

Now, in the description given above, a description was given for the case where linear approximation equations were acquired in the advance process, but the advance process and the process of the skin correction color calculation portion 14 may be carried out based on approximation equations other than linear equations.

The iris detection portion 15 carries out an iris detection process on the image forming the processing object of the iris color correction apparatus 10 from the images stored in the memory portion 11. In the iris detection process, the iris detection portion 15 reads out the image inside the face rectangle 20 detected by the face detection portion 12 from the image forming the processing object, and detects an iris region from the read out image. The iris region is an image that includes the iris of the photographed person in which the face is detected by the face detection portion 12.

The iris detection process carried out by the iris detection portion 15 may be formed so as to detect an iris by template matching using a reference template corresponding to the shape of the iris. At this time, the iris detection portion 15 may be formed so as to carry out an iris detection process by selecting a template corresponding to an iris diameter estimated from the size of the face rectangle 20 detected by the face detection portion 12. Further, the iris detection portion 15 may be formed so as to restrict the region where template matching is carried out by estimating the rough iris position from the position of the detected face rectangle 20. Further, the iris detection process carried out by the iris detection portion 15 may be realized by any other method in addition to template matching. For example, the iris detection portion 15 may be formed so as to detect an iris by tracing the outline of the iris after edge extraction has been carried out on the input image. The iris detection portion 15 detects an iris by an iris detection process, and outputs information (hereinbelow, referred to as "iris region information") which shows the region of the iris.

Figure 3:
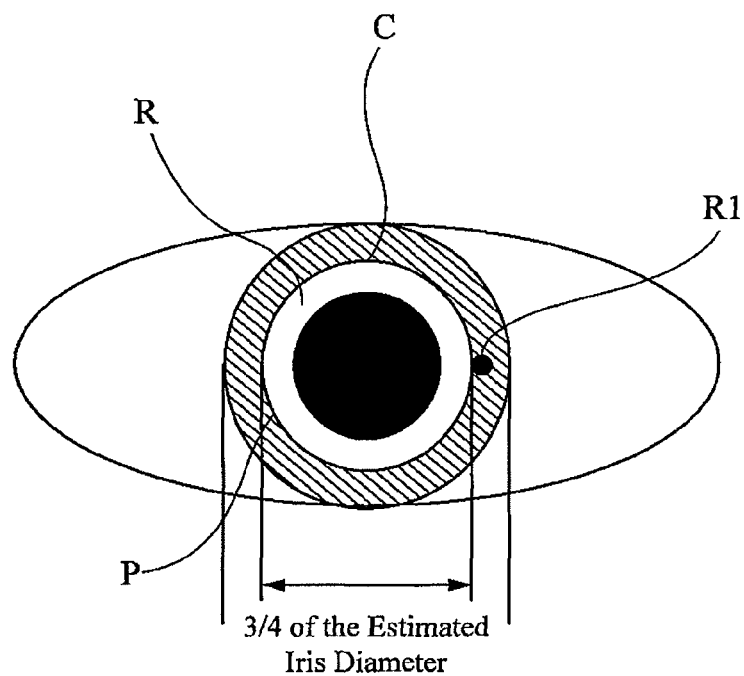
FIG. 3 is a drawing which shows an example of a peripheral region of an iris.

The original iris color detection portion 16 obtains the color of a peripheral region of the iris of the photographed body estimated by the iris detection portion 15. Namely, as shown in FIG. 3, from an iris region R obtained by the iris detection portion 15, an outside region R1 of a circle C concentric with such iris region and having a diameter of ¾ of the iris diameter obtained by the iris detection portion 15 forms a peripheral region of the iris of the photographed body, the average color of each pixel present in such peripheral region is measured, and the obtained color forms the original iris color.

The correction reference color setting portion 17 sets the iris correction reference color that forms the reference color in the case where red-eye correction is carried out. Namely, the correction reference color setting portion 17 acquires the skin correction color obtained by the skin correction color calculation portion 14 for the same photographed body and the original iris color obtained by the original iris color detection portion 16, corrects the peripheral region of the iris based on the skin correction color, and compares such corrected iris color and the original iris color. Then, the correction reference color setting portion 17 judges whether or not the corrected iris color has more redness than the original iris color, and in the case where it has more redness, sets the original iris color to be the iris correction reference color, and in the case where it has less redness, sets the skin correction color to be the iris correction reference color.

Namely, in the case where the iris color corrected based on the skin color has more redness compared to the original iris color before correction, it can be judged that a red-eye phenomenon does not occur in the peripheral region of the iris. Accordingly, because the iris color of the photographed body itself remains in such peripheral region, a higher quality correction can be carried out by setting the original iris color to be the iris correction reference color. Conversely, in the case where it has less redness, a red-eye phenomenon also occurs in the peripheral region of the iris, and because it can be assumed that the original iris color is lost in the entire iris, the correction for the skin color can be carried out by setting the skin correction color created based on the skin color to be the iris correction reference color, whereby the same effect as that of the invention disclosed in Patent Document 2 can be obtained.

In the case where the redness is the same, either one may be set as the iris correction reference color, but in the present embodiment, the original iris color is set as the iris correction reference color. The reason for this is that there is a high possibility that correction to the natural iris color in the photographed body can be carried out better by using the original iris color which is the iris color possessed by the photographed body itself.

The evaluation of redness is judged by the R component ratio (Rrate) shown in the equation below.

$$Rrate=R/(R+G+B)$$

Condition: $0 \leq R, G, B \leq 255$

Further, the correction process for the peripheral region of the iris based on the skin correction color can be carried out using the same method as that of the correction process in the correction portion 19 described later.

Based on the iris region information outputted by the iris detection portion 15, the judgment portion 18 identifies the color of each pixel showing the iris in the input image, and judges the presence or absence of the occurrence of an abnormality such as red-eye or gold-eye or the like, namely, whether a correction is required or not. Namely, each pixel of the iris region and the iris correction reference color are compared, and the amount of redness (R component ratio) is obtained. In the case where the ratio of pixels in which the redness of the input image is higher than the redness of the iris correction reference color is greater than or equal to a prescribed value, it is judged that an abnormality such as red-eye or the like occurs and correction is required. Of course, it is not necessary in the present invention to provide the judgment portion 18 to judge whether a correction is required or not each time, and the entire iris color may be corrected without judging whether such correction is required or not.

The correction portion 19 carries out a correction process based on the judgment result by the judgment portion 18. Namely, the correction portion 19 carries out a correction process in the case where it is judged that an abnormality occurs in the image of the iris of the input image by the judgment portion 18. The correction portion 19 corrects the color of the pixels inside the iris region detected by the iris detection portion 15 based on the iris correction reference color set by the correction reference color setting portion 17.

A concrete correction process is as follows below. The correction portion 19 carries out a process separately for the color level and the brightness on the color of the pixels forming the correction object. First, the color level is set in accordance with the iris correction reference color. Namely, a replacement with the iris correction reference color (skin correction color or original iris color) is carried out while maintaining the brightness. In this regard, the correction portion 19 acquires the brightness for the pixels forming the correction object based on the equation below.

$$Y=0.299R+0.587G+0.114B$$

Further, each value of R, G, B is set to be an integer value from 0 to 255. Then, the correction portion 19 acquires the RGB values (hereinbelow, set to be Nr, Ng, Nb) in which the same brightness as the brightness Y of the pixels forming the correction object is acquired while maintaining the ratio of the respective R, G, B values of the iris correction reference color. This is for maintaining the effect of catch light. The correction portion 19 carries out a correction process on the color level by giving the Nr, Ng, Nb values obtained in this way to the pixels forming the correction object.

Further, in the description give above, the correction color was set so as to maintain the R, G, B ratio, but without being limited to this, it is sufficient if there is a method in which the R, G, B ratio (color level) is set based on the iris correction reference color.

On the other hand, in the correction of the brightness, the brightness value before the occurrence of red-eye is estimated based on the value of the pixels. The estimation of such brightness value is carried out based on the G and B values. This is because the amount of increase of the brightness value that rises by the red-eye phenomenon is believed to be due to mainly red light. Accordingly, because the optimum ratio of each of the RGB colors is determined from the iris correction reference color, if the G and B values are determined, it is possible to estimate the brightness value before the occurrence of red-eye. Further, even though there is an increase in size of not only the pure R component but also the G and B values, the red-eye reflection light can be ignored compared to the amount of increase of R.

Further, the pixels are replaced by a color in which the brightness of the iris correction reference color matches the brightness estimated from the value of the pixels. Namely, the values of the pixels after correction are formed by carrying out conversion so that the GB brightness value of the color after correction becomes the same as the GB brightness value of the correction object pixels while maintaining the ratio of the RGB values of the iris correction reference color. In this regard, the GB brightness Lgb is calculated by the following equation.

$$Lgb = 0.857G + 0.114B$$

In accordance with the present embodiment, the iris color correction apparatus 10 judges whether a correction process is required or not for the iris portion of the input image based on the judgment result of the judgment process by the judgment portion 18. Then, in accordance with this judgment result, a correction process is carried out using an iris correction reference color formed from either the original iris color or the skin correction color estimated based on the skin color. Therefore, without troubling the user, the iris color of the photographed person can be corrected to the normal color for images in which an abnormality such as the red-eye phenomenon or the like occurs.

Further, in the iris color correction apparatus 10, when the correction process is carried out, the color is set based on the iris correction reference color in the state where the GB brightness of the pixels forming the correction object of the input image is maintained. Namely, color replacement is carried out in the state where the GB brightness of each original pixel is maintained. Therefore, it becomes possible to carry out a more natural correction process, which is different from the case (the case of the so-called painting all over) where one color is simply replaced by the skin correction color or the original iris color. Namely, it becomes possible to show the spherical shape of the eyeball and the moist feeling of the eyeball surface naturally in the image of the iris after correction without loss of the effect due to the natural phenomenon occurring in the iris surface of the so-called catch light or the like. The reason for this is that, because the catch light or the like shining in has sufficiently high GB brightness, there is no loss even by correction of such color. Accordingly, the iris color correction apparatus of the present embodiment makes it possible to realize a high-quality image correction.

Further, in the embodiment described above, the iris correction reference color was set based on either the skin correction color or the original iris color, but the present invention is not limited to this, and it may be applied to the case where the skin correction color without alteration forms the iris correction reference color like the invention disclosed in Patent Document 2.

Figure 4:
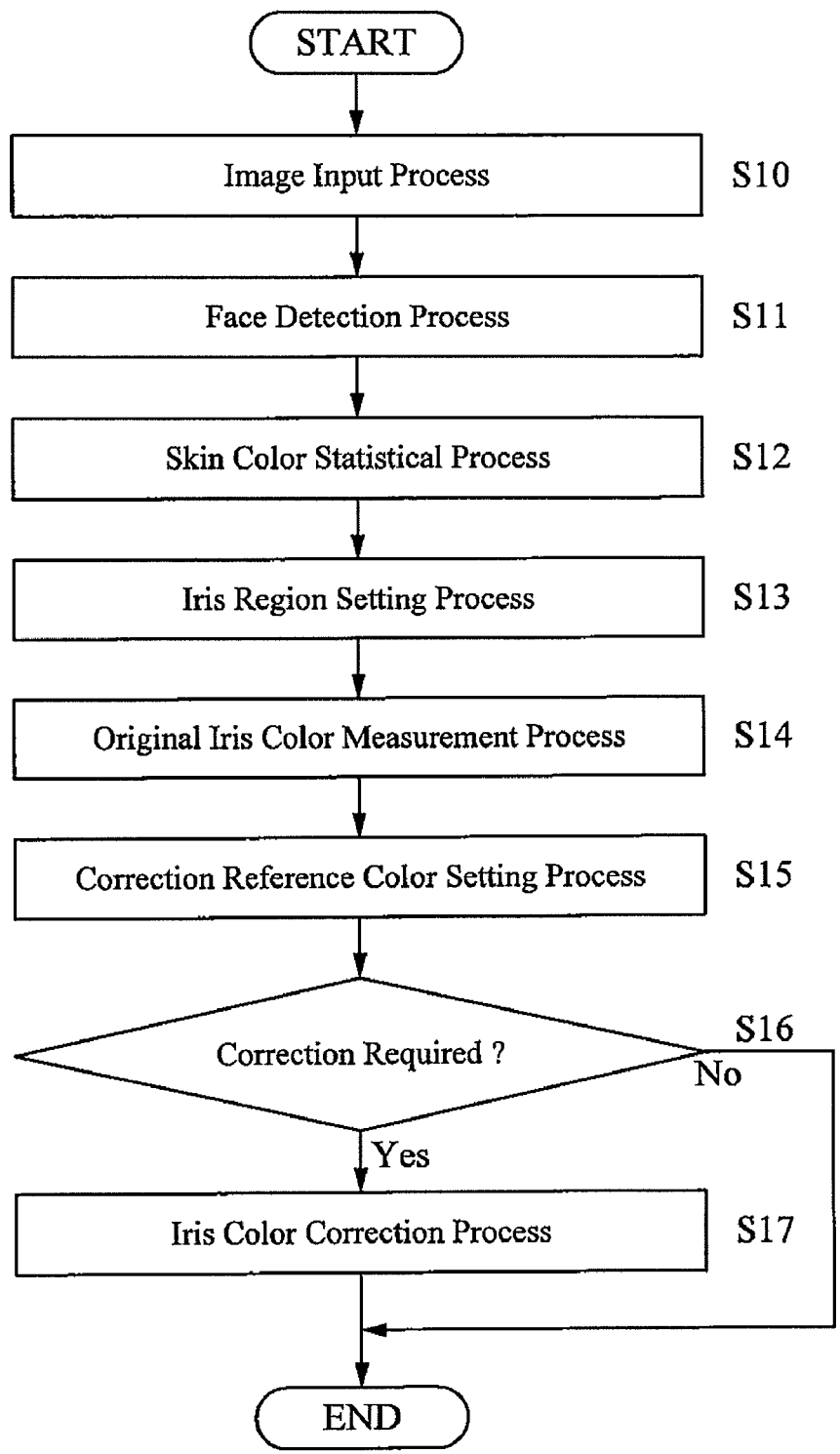
FIG. 4 is a flowchart which shows an example operation of the iris color correction apparatus.

FIG. 4 is a flowchart which shows an example operation of the iris color correction apparatus 10. The example operation of the iris color correction apparatus 10 will be described using FIG. 4. The iris estimation apparatus 10 stores supplied image data in the memory portion 11 (S10). Next, the face detection portion 12 carries out a face detection process which detects the face of the photographed person from the image forming the processing object (S11). Namely, the face detection portion 12 detects a face rectangle 20 from the image forming the processing object, and acquires face rectangle information.

Next, the skin color identification portion 13 and the skin correction color calculation portion 14 carry out a skin color statistical process, and calculate a skin correction value which is an iris color estimated based on the skin color (S12). Namely, the skin color identification portion 13 carries out the skin color statistical process based on the face rectangle information acquired by the face detection portion 12, and identifies a representative value of the skin color. Next, using an approximation equation in which the representative value of the skin color obtained by the skin color identification portion 12 is acquired in advance, the skin correction color calculation portion 14 estimates the iris color of the person who's face was detected by the face detection portion 12, and obtains a skin correction color. Then, the skin correction color calculation portion 14 outputs the estimated skin correction color.

The iris detection portion 15 detects an iris region (S13). Next, the original iris color calculation portion 16 obtains an estimated iris diameter of the iris region detected by the iris detection portion 15, calculates a representative color of the peripheral region of such iris, and obtains an original iris color (S14).

The correction reference color setting portion 17 acquires the original iris color (the representative value of the peripheral region of the iris) obtained by the original iris color calculation portion 16, and an iris color in which the peripheral region of the iris has been corrected based on the skin correction color (the iris color estimated based on the skin color) obtained by the skin correction color calculation portion 14, compares both of these, and sets the color having the least redness to be the iris correction reference color (S15).

Next, the judgment portion 18 judges whether or not an abnormality such as red-eye or the like occurs in the iris of the input image based on the iris correction reference color set by the correction reference color setting portion 17 and the color of each pixel inside the iris region detected by the iris detection portion 15 (S16).

In the case where the judgment result is there is no need for correction, the process is terminated at that point. In the case where the judgment result is there is a need for correction, the correction portion 19 carries out a correction process based on the iris correction reference color and each pixel of the iris region (S17). Namely, the correction portion 19 obtains the color level and the brightness separately, and for the color level it carries out a correction using the iris correction reference color set from the skin color or the iris color, and for the brightness it estimates the brightness before the red-eye phenomenon occurs using the GB brightness, and carries out correction so as to match that.

In the iris color correction apparatus, the normal iris color of the photographed person from the skin color of such person in the input image, namely, the iris color that should be shown in the image is estimated based on an approximation equation acquired in advance. Therefore, even in the case where a problem such as red-eye or gold-eye or the like occurs in the input image, it becomes possible to estimate the normal iris color of the photographed person separately from the abnormal iris color due to this kind of red-eye or gold-eye. Accordingly, the user can judge whether correction should be carried out on the iris portion of the input image based on the skin correction color estimated in this way. Namely, the user can easily judge whether correction should be carried out on the iris portion of the input image by comparing the iris color of the input image and the skin correction color. Further, the user can carry out correction on the iris portion of the input image based on the skin correction color estimated in this way, and this makes it possible to obtain an image having a normal color iris that is not awkward.

Furthermore, because the original iris color of the iris peripheral region is obtained and judgment is carried out as to which of the original iris color and skin correction color is suited for the iris correction reference color, a more highly accurate correction is possible. Namely, this is because in the case where red-eye occurs in a portion of the iris such as the center of the iris or the like and the iris color possessed by the photographed body itself remains in the iris peripheral region, the carrying out of a red-eye correction based on such remaining iris color (original color) makes it possible to carry out correction to a more natural iris color.

Further, the user can judge whether correction should be carried out on the iris portion of the input image based on the iris correction reference color estimated in this way. Namely, the user can easily judge whether correction should be carried out on the iris portion of the input image by comparing the iris color of the input image and the skin correction color iris correction reference color. Further, the user can carry out correction on the iris portion of the input image based on the skin correction color estimated in this way, and this makes it possible to obtain an image having a normal color iris that is not awkward.

Further, in the present embodiment, by estimating the brightness before the phenomenon of an iris color abnormality occurs, and correcting the iris color so that such brightness reappears, the correction of the pupil to white is prevented, and this makes it possible to realize a higher quality correction.

This kind of iris color correction apparatus 10 may be applied to image capturing apparatuses such as digital still/video cameras and the like or information processors and the like equipped with these kinds of image capturing apparatuses. By applying the iris color correction apparatus to image capturing apparatuses and the like, it becomes possible to judge whether an abnormality such as red-eye or gold-eye or the like occurs in the captured image based on the outputted iris correction reference color. Similarly, by applying the iris color correction apparatus, it becomes possible to obtain the color (i.e., skin correction color/original color) that should be corrected for the iris image. Accordingly, it becomes possible in these image capturing apparatuses and the like to carry out a suitable correction or give a warning to the user or suggest a skin correction color to the user or the like in accordance with the judgment.

The judgment portion 18 may be formed so as to carry out a judgment separately for each of the left and right irises of the photographed person, and output a judgment result for each of the irises. Of course, because the left and right irises of the photographed person are the same color in most cases, rationally it can be formed so that the correction color also uses the same color left and right. Further, in the case where the faces or the like of a plurality of photographed people is detected in the input image, the iris color correction apparatus may be formed so as to carry out the judgment process and the like for everyone, or it may be formed so as to carry out the judgment process and the like only for photographed people satisfying prescribed conditions (e.g., people having a face rectangle size that is greater than or equal to a prescribed size, people positioned near the center of the picture, or specific people judged from face recognition results). Further, the iris correction process may be carried out for all the images without carrying out a judgment of whether correction is required or not.

The iris color correction apparatus may be realized separately by installing an application program in a dedicated apparatus or a personal computer, or it may be packaged in an image capturing apparatus such as a digital still camera or a digital video camera or the like or a mini-lab device or other image processing apparatus.

The invention claimed is:

1. An iris color correction apparatus comprising:
   a processor for:
   a skin color identification means which identifies the skin color of a photographed person in an inputted image;
   a skin correction color calculation means which obtains a skin correction color that is an iris color of said person that should be shown in said image based on the skin color identified by said skin color identification means;
   a brightness estimation means which estimates a GB brightness value and forming correction object pixels before a color tone abnormality occurs in pixels of an iris portion of said photographed person from a value of said pixels of said iris portion; and
   a correction means which corrects the iris color of said photographed person based on said estimated GB brightness value and a correction reference color based on said skin correction color;
   wherein said brightness estimation means are equipped with a function that calculates said GB brightness value which is a brightness set based on G and B values from R, G, B values that create the skin color of said pixels of said iris portion; and
   wherein said correction means carry out conversion so that a GB brightness value of the correction reference color becomes the same as the GB brightness value of the correction object pixels based on R, G, B values of the correction reference color.

2. The iris color correction apparatus described in claim 1, further comprising:
   a face detection means which detects a face region that includes an entire face or a portion thereof of the photographed person in the inputted image, and
   an iris detection means which detects an iris region that includes the entire iris or a portion thereof of said person detected by said face detection means,
   wherein said skin color identification means identifies a skin color based on color of pixels included in the face region detected by said face detection means.

3. The iris color correction apparatus described in claim 2, further comprising:
   a judgment means which judges whether an abnormality occurs in the iris color of said person in said image by comparing the skin correction color obtained by said skin correction color calculation means and the color identified from the iris region detected by said iris detection means,
   wherein said correction means carries out a correction process in the case where an abnormality is judged by the judgment means.

4. The iris color correction apparatus described in claim 3, wherein said judgment means judges whether an iris portion of said person in said image forms red-eye by comparing the redness in the iris color estimated by said iris color estimation means and the redness in the color identified from the iris region detected by said iris detection means.

5. An iris color correction apparatus comprising:
   a processor for a skin color identification means which identifies the skin color of a photographed person in an inputted image;

a skin correction color calculation means which obtains a skin correction color that is an iris color of said person that should be shown in said image based on the skin color identified by said skin color identification means;

an original iris color calculation means which obtains an original iris color that is a representative color of a peripheral region of the iris of said photographed person from the color of pixels included in the peripheral region;

a correction reference color setting means which sets a correction reference color by either of said obtained skin correction color or original iris color;

a brightness estimation means which estimates a GB brightness value and forming correction object pixels before a color tone abnormality occurs in pixels of an iris portion of said photographed person from a value of said pixels of said iris portion; and a correction means which corrects the iris color of said photographed person based on said correction reference color and said estimated GB brightness value;

wherein said brightness estimation means are equipped with a function that calculates said GB brightness value which is a brightness set based on G and B values from R, G, B values that create the skin color of said pixels of said iris portion; and wherein said correction means carry out conversion so that a GB brightness value of the correction reference color becomes the same as the GB brightness value of the correction object pixels based on the R, G, B values of the correction reference color.

6. The iris color correction apparatus described in claim 5, further comprising:

a face detection means which detects a face region that includes an entire face or a portion thereof of the photographed person in the inputted image, and an iris detection means which detects an iris region that includes the entire iris or a portion thereof of said person detected by said face detection means, wherein said skin color identification means identifies a skin color based on color of pixels included in the face region detected by said face detection means.

7. The iris color correction apparatus described in claim 6, further comprising:

a judgment means which judges whether an abnormality occurs in the iris color of said person in said image by comparing the skin correction color obtained by said skin correction color calculation means and the color identified from the iris region detected by said iris detection means, wherein said correction means carries out a correction process in the case where an abnormality is judged by the judgment means.

8. The iris color correction apparatus described in claim 7, wherein said judgment means judges whether an iris portion of said person in said image forms red-eye by comparing the redness in the iris color estimated by said iris color estimation means and the redness in the color identified from the iris region detected by said iris detection means.

9. A non-transitory computer readable medium storing a program comprising functionality for causing a computer to perform:

identifying a skin color of a photographed person in an inputted image;

obtaining a skin correction color that is an iris color of said person that should be shown in said inputted image based on the identified skin color;

estimating a GB brightness value and forming correction object pixels before a color tone abnormality occurs in pixels of an iris image of said photographed person from a value of said pixels of said iris portion; and calculating a GB brightness value which is a brightness set based on G and B values from R, G, B values that create the skin color of said pixels of said iris portion;

carrying out a correction of the iris color of said photographed person based on said estimated GB brightness value and a correction reference color based on said skin correction color; and carrying out a conversion so that a GB brightness value of the correction reference color becomes the same as the GB brightness value of the correction object pixels based on R, G, B values of the correction reference color.

\* \* \* \* \*